Feb. 24, 1959 C. STAMOS Re. 24,611
SUSPENSION MEANS FOR CONVEYOR BELT
Original Filed June 14, 1954
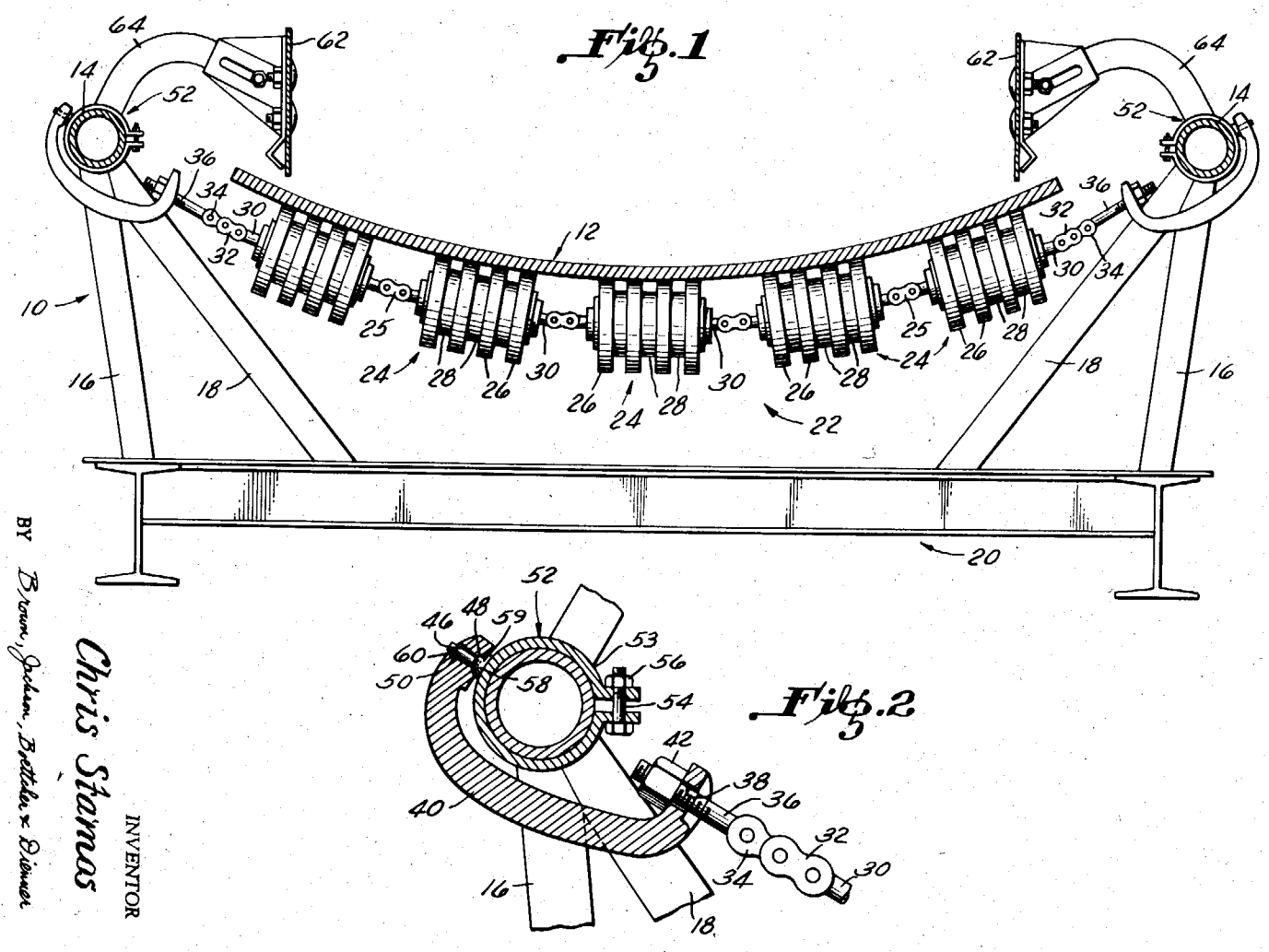
INVENTOR
Chris Stamos
BY Brown, Jackson, Boettcher & Dienner
ATTORNEYS United States Patent Office Re. 24,611
Reissued Feb. 24, 1959

24,611

SUSPENSION MEANS FOR CONVEYOR BELT

Chris Stamos, Chicago, Ill., assignor to The United Electric Coal Companies, Chicago, Ill., a corporation of Delaware Original No. 2,798,591, dated July 9, 1957, Serial No. 436,270, June 14, 1954. Application for reissue December 2, 1957, Serial No. 700,930

9 Claims. (Cl. 198—192)

Matter enclosed in heavy brackets [ ] appears in the original patent but forms no part of this reissue specification; matter printed in italics indicates the additions made by reissue.

The present invention relates to a suspension means for conveyor belts. More particularly, the invention relates to a suspension type conveyor belt carrier or support.

Conveyor belts in the past have been mounted on relatively fixed and rigid frames which have proved to be expensive to manufacture and difficult to erect. Moreover, the supporting frames of prior practices have provided an inflexible and unyielding support for the conveyor belts mounted thereon and considerable care has had to be taken to avoid placing unbalanced loads on the belt due to the fact that the unevenly distributed load had the effect of unduly wearing the portion of the belt carrying the load and overloading the portions of the belt supports disposed immediately under the load. It has also been found that it has been difficult to replace worn elements of the present conveyor belt supporting frames without having to cease conveying operations and dismantle large portions of the supporting frames to effect repairs.

Considerable research in the conveyor belt art has convinced me that there is a definite need for a conveyor belt support which is of few and simple parts, which will flex in a vertical plane perpendicular to the line of travel of the belt to enable the belt and the support therefor to carry unbalanced loads without damage thereto, and which may be erected and dismantled with a minimum of expense and effort.

It is therefore an object of the invention to provide means for supporting a conveyor belt which allows the belt to shift into a position to accommodate an unbalanced load carried thereon, thereby better distributing the load on the supporting means, and lessening wear on the belt.

Yet another object of the invention is to provide means for supporting a conveyor belt which includes a plurality of spaced flexible members each carrying a plurality of roller means, suspended between coextending fixed supports to define a concave supporting surface for the belt.

A further object of the invention is to provide means for supporting a conveyor belt which includes a plurality of spaced flexible members, on which the conveyor belt is mounted, which are free to flex vertically and swing longitudinally of the belt to accommodate an unbalanced load passing over them on the conveyor belt.

Yet a further object of the invention is to provide a flexible member, including a plurality of pivotally connected rollers, which is adapted to be suspended between two supporting members and provide an arcuate frictionless support for the conveyor belt moving thereover.

Still a further object of the invention is to provide means for securing transversely disposed conveyor belt suspension elements between supporting members wherein a universal joint action is provided between the suspension elements and the supporting members.

Still another object of the invention is to provide a hook for connecting conveyor belt suspension elements between supporting members wherein the hook may be readily engaged and disengaged, and wherein a universal joint action is provided between the suspension element and the supporting members.

In accordance with the present invention, I provide a support for a conveyor belt comprising a pair of coextending rigid members, which may be disposed in a substantially horizontal plane, and a plurality of spaced flexible members adapted to be suspended between said rigid members. The flexible members each comprise a plurality of pivotally connected roller assemblies and are suspended between said rigid members to define a flexible concave supporting surface for the belt, with the belt riding on the roller assemblies. Each of the flexible suspension members has a hook connected to each end thereof for suspending the members between said rigid members and the hooks are provided with a recess or hole at the terminus thereof for receiving protuberances carried by clamps fixed at desired locations on the rigid members.

From the foregoing, it will be apparent that my invention provides substantial advantages over prior practices. For instance, the link arrangement between the rollers carried by each of the flexible suspension members allows for flexing in a vertical plane perpendicular to the line of travel of the belt, and the connection between the suspension members and the rigid supporting members provides a universal joint action which allows the suspension members to swing about their mountings. These factors allow the belt and the support therefor to "give" or "roll with the punch" when unbalanced heavy loads are carried by the belt, and if the belt is unevenly loaded, the series of rollers carried by each of the suspension members will shift out of its normal position, defining an arcuate or concave supporting surface, into a position to accommodate the unbalanced load with lessened wear on the belt and better distribution of the load on the rollers. Moreover, the individual suspension elements may be secured to and removed from the rigid supporting members with heretofore unknown facility.

In addition to the foregoing, it is an object of the present invention to provide suspension means for conveyor belts which is economical of manufacture, convenient of use, and capable of being installed by the skilled and unskilled with equal facility.

Other objects and advantages of the present invention will become apparent in the following description of a preferred embodiment of the invention and the preferred use thereof.

Now, in order to acquaint those skilled in the art with the present invention and the manner of making and using the same, I shall describe, in connection with the accompanying drawings, a preferred embodiment of the invention.

In the drawings:

Figure 1 is a cross-sectional view through a supporting frame for a conveyor belt, showing my invention applied thereto; and Figure 2 is a fragmental view, partially in section and on a larger scale, showing the supporting hook comprising my invention.

Referring now more particularly to the drawings, reference numeral 10 of Figure 1 generally indicates the conveyor belt suspension means comprising my invention and reference numeral 12 generally indicates the upper run of a conventional conveyor belt. Rigid parallel supporting members 14, which may take the form of elongate lengths of pipe secured end to end in any suitable manner, are fixed in a substantially horizontal, or in an inclined, position by the supporting braces 16 and 18 fixed in any suitable manner to the frame generally indicated at 20. Suspended between the supporting members 14 for carrying or supporting belt 12 are a plurality of spaced flexible suspension members or carriers 22, one of which is shown in elevation in Figure 1. The members 22 each comprises a plurality of roller units 24 pivotally connected together by links 25. The roller units 24 may be of the type described in [applicant's] *the* copending application *of John J. Huey and me,* Serial No. 377,175, filed August 28, 1953, *now Patent No. 2,862607,* and may include large discs 26, against which the belt 12 bears, and smaller discs 28, suitably united and journalled on rods 30. The discs may be formed out of belting, rubber or steel, which provides rollers having significant shock absorption qualities, but I comprehend that hollow steel rollers may be used where lightness of weight is an overriding factor. Links 25 (two between each rod 30) are pivotally secured to the ends of rods 30 in any suitable manner. Pivotally secured to the ends of the outer rods 30 are links 32, which are similar to the links 25, and the links 32 each are pivotally connected to the links 34 that in turn pivotally carry the threaded bolts 36.

Referring now more particularly to Figure 2, the bolts 36 are *each* received in a hole 38 formed in a C-shaped *link or* hook member 40, and lock nuts 42 are threaded on the bolts 36 to maintain the member 40 in proper position on the bolt with respect to the remainder of the suspension member. The terminus of each member 40 is formed with opening 46 having a rounded internal surface 48 and substantially rectilinear, diverging internal surface 50. Mounted on each of the supporting members 14 at the points thereon where it is desired to secure the suspension members 22 are the clamps 52 which comprise a suitably formed strip of metal 53 secured to the members 14 by, for instance, bolts 54 and nuts 56. Each of the clamps fixedly carries a protuberance 58, including a rounded surface 59 and a stud 60 extending outwardly from the center thereof. The relationship between the surfaces 48 and 50, the rounded surface 59 and the stud 60 is such that the surface 48 bears against the surface 59 and the stud 60 extends into opening 46 when the hook member 40 is received on the protuberance. As will be noted from the drawing, the surface 50 converges in the direction of the rounded surface 48, which allows the member 40 to rock with respect to the stud 60, and preferably the elements are proportioned to allow considerable play between the hook member 40 and protuberance 58 so that this structure provides in effect a ball and socket universal joint between the suspension member 22 and the supports 14.

When the belt suspension means is erected, the members 14 are secured in place in any suitable manner, such as by the supporting braces 16 and 18 and the frame 20, and clamps 52 are secured in pairs to the members 14 in spaced apart relationship, for instance, three feet apart. The clamps are positioned on the respective members 14, as shown in Figure 1, so that the surface 58 and the stud 60 extending therefrom are directed away from the main body portion of suspension member 22 when it is secured in position. Each member 22, carrying the hooks 40, is then secured in position by bringing the terminus of the separate hooks 40 around the respective members 14, so that the studs 60 and the surfaces 58 are received in the opening 46. When so positioned, the suspension members 22 define a concave support for the belt 12, as shown in Figure 1. The degree of arc in the suspension members may be adjusted by moving the lock nut 42 to the desired position. Alternatively, the hook members 40 may be first received on the protuberances, and then the ends of bolts 36 inserted into the holes 38, respectively, with the lock nuts 42 then being positioned to provide the desired arc in the suspension member 22. I prefer to mount skirt boards 62 along the edge of the belt 12, which may be fixed in position by rigid members 64 suitably fixed to the supporting members 14.

It will be appreciated that the roller units 24 are connected to each other for pivotal movement with respect to each other, and the bolts 36, about substantially parallel, [vertical] *horizontal* axes. Moreover, the connection between the hook members 40 and the support members 14 (through the clamps 52) comprises a universal joint, which allows a substantial swinging movement, governed by the size of the stud 60 with respect to the opening 46, and it is to be noted that the centers of the swinging movement are on the extreme opposite sides of the conveyor support. Thus, when the belt is unevenly loaded, the series of roller units 24 comprising the respective suspension members 22 will shift out of their illustrated arcuate position, and swing back and forth, as the load approaches and passes over the suspension members, to accommodate the unbalanced load, thereby better distributing the load on the rollers, and provide a more even loading of the suspension members as the load passes along the belt 12. The suspension members therefore tend to "give" or "roll with the punch" of the load and by so doing reduce the wear on the belt 12 and the strain on the conveyor supports to a minimum. It has been found that the considerable distance between the centers of the swinging movement of the suspension members is a substantial contributing factor in providing a smooth application of unbalanced loads on the suspension members 22.

It should also be noted that the means for securing the suspension members to the supporting members 14 greatly facilitates the erection and maintenance of the conveyor supporting structure. Thus, the suspension members are secured in place by merely passing the hooks 40 around the supporting members 14 to engage the protuberances formed on the clamps 52. Moreover, if one desires to mount the hook members 40 first when erecting the conveyor support, one merely positions the hook members so that the protuberances 58 are received in holes 46, respectively, and the hook members will hang conveniently in a position to receive bolts 36. The studs 60 not only aid in the positioning of the holes 46 with respect to the protuberances; they also act as hangers for hook members 40 since if the body of the suspension member 22 is detached for any reason from the hook members 40, the studs 60 prevent the hook members 40 from dropping away from the supports 14. Manifestly, if one desires to eliminate these functions of protuberance 58, the stud 60 may be eliminated and the protuberance 58 may then comprise a substantially hemispherical shaped element.

A substantial advantage of the above described structure is that, due to ability of the suspension member to better accommodate unbalanced loads, it is capable of carrying heavier loads than other types of conveyor supports, and further, since it consists of few and simple parts which may be formed out of light weight materials, the overall support structure is much lighter than supports of prior practices.

The foregoing description and the drawings are given merely to explain and illustrate my invention, and the invention is not to be limited thereto, except in so far as the appended claims are so limited since those skilled in the art who have my disclosure before them will be able to make modifications and variations therein without departing from the source of the invention.

I claim:

1. A suspension device for conveyor belts comprising a flexible belt supporting member to be suspended between two supports, and a pair of suspension assemblies to connect the ends of said flexible member to the supports each of said assemblies including a first member adjustably and detachably connected to said flexible member for adjustment longitudinally of said flexible member and a second member to be adjustably secured to a support at least to accommodate adjustment of said second member longitudinally of the support, said first and second members having engaging surfaces comprising a universal joint between said flexible member and the support.

2. A suspension device for conveyor belts comprising a flexible non-stretchable member to be suspended between two supports, belt supporting rollers journaled on said flexible non-stretchable member, and a pair of suspension assemblies to connect the ends of said flexible member to the supports, each of said assemblies including a first rigid member adjustably and detachably connected to one end of said flexible member for adjustment longitudinally of said flexible member and a second rigid member to be adjustably secured to a support at least to accommodate adjustment of said second member longitudinally of the support, said first and second members having engaging surfaces comprising a universal joint between said flexible member and the support, each of said assemblies effectively accommodating adjustment of the length of said flexible member and accommodating disposition of said flexible member at various locations on and in various angular locations to the supports.

3. Suspension means for a conveyor belt comprising a pair of coextending supports to opposite sides of the belt, a flexible member suspended between said supports, roller means journaled on said flexible member to engage and support the belt, and a pair of suspension assemblies connecting the ends of said flexible member to said supports, each of said assemblies including a pair of members connected respectively to the end of said flexible member and the adjacent support and comprising a universal joint therebetween, the member of said pair of members connected to said support being adjustably secured thereto to accommodate independent adjustment of said member at least longitudinally of said support to accommodate suspension of said flexible member in a variety of positions longitudinally of the belt and at various angles to the longitudinal axis of the belt.

4. Suspension means for a conveyor belt comprising a pair of coextending supports to opposite sides of the belt, a flexible member suspended between said supports, roller means journaled on said flexible member and defining a supporting surface to engage and support the belt, said flexible member being suspended to define a concave supporting surface, and a pair of suspension assemblies connecting the ends of said flexible member to said supports, each of said assemblies including a pair of members connected respectively to the end of said flexible member and the adjacent support and comprising a universal joint therebetween, the member of said pair of members connected to said support being adjustably secured thereto to accommodate independent adjustment of said member at least longitudinally of said support, each of said assemblies including a lengthwise adjustable connection between the end of said flexible member and said pair of members effectively to accommodate variation in the length of said flexible member, whereby each of said assemblies accommodates suspension of said flexible member in a variety of positions longitudinally of the belt and at various angles to the longitudinal axis of the belt without necessitating, but accommodating when desired, variation in the degree of concavity of said supporting surface.

5. Suspension means for a conveyor belt comprising a pair of coextending generally horizontal rigid supports to opposite sides of the belt, an elongate flexible non-stretchable member suspended between said supports, said flexible non-stretchable member comprising a plurality of pivotally connected roller assemblies each including a roller journaled on said member, said flexible non-stretchable member being suspended between said supports to define a concave supporting surface for the upper run of the belt, and a suspension assembly for each end of said flexible non-stretchable member, each of said suspension assemblies including cooperating members secured respectively to one end of said flexible non-stretchable member and to the adjacent support and comprising a ball and socket connection between said flexible non-stretchable member and the support, the member of said cooperating members secured to the said support being adjustably secured to said support to accommodate adjustment thereof at least longitudinally of said support to accommodate suspension of said flexible non-stretchable member in a variety of positions longitudinally of the belt and at various angles to the longitudinal axis of the belt thus to accommodate disposition of said flexible non-stretchable member at an optimum position of support for the belt and/or to accommodate disposition of said flexible non-stretchable member in such relation to the belt as to afford a belt aligning function.

6. Suspension means as set forth in claim 5, wherein said member of said cooperating members adjustably secured to said support is also adjustable angularly about said support, and each of said suspension assemblies includes a lengthwise adjustable connection between the end of said flexible non-stretchable member of said cooperating members effectively to accommodate variation in the length of said flexible non-stretchable member thus to vary the degree of concavity of the belt supporting surface defined thereby, said member secured to said support being adjustable angularly about said support to maintain the said ball and socket connection normally in axial alignment with the end of said flexible non-stretchable member.

7. Suspension means for a conveyor belt comprising a pair of spaced substantially parallel generally horizontal rigid tubular supports to opposite sides of the belt, a flexible non-stretchable member suspended between said supports, a plurality of rollers journaled on said flexible non-stretchable member and defining a belt supporting surface, said flexible non-stretchable member being suspended between said supports to define by means of said rollers a concave belt supporting surface, said flexible non-stretchable member terminating at each end thereof in a stud, a suspension hook adjustably mounted on each of said studs for adjustment longitudinally thereof effectively to accommodate variation in the length of said flexible non-stretchable member between said hooks, a generally circular clamp encircling each of said supports for adjustment angularly about and longitudinally along the respective support and including means for securing the same in adjusted position on the respective support, and a generally radial protuberance carried by each of said clamps, said clamps being positioned on said supports to dispose said protuberance to the outer side of said supports, said hooks each extending around the adjacent support and having a recess formed in the terminus thereof within which the respective protuberance is received, said protuberances and said recesses having mating surfaces defining a universal joint therebetween, said hooks being adjustable longitudinally of said flexible non-stretchable member and said clamps being adjustable angularly about said supports to vary the degree of concavity of the belt supporting surface and to accommodate lowering of said flexible non-stretchable member away from the belt to permit removal of said hooks from said protuberances, thus to permit replacement of said flexible non-stretchable member without interfering with the use of the belt, said clamps being independently adjustable longitudinally of said supports to accommodate suspension of said flexible non-stretchable member in a variety of positions longitudinally of the belt and at various angles to the longitudinal axis of the belt, thus to accommodate disposition of said flexible non-stretchable member at an optimum position of support for the belt and/or to accommodate disposition of said flexible non-stretchable member in such relation to the belt as to afford a belt aligning function.

8. A device for supporting a load from a rigid support member comprising means adjustably mounted on said member for adjustment angularly about and longitudinally of said member, said means including an outwardly extending protuberance and a C-shaped member having a recess formed in one of its arms at the end thereof and a load engaging surface formed on the other arm thereof in alignment with said recess, said one arm fitting over said protuberance to position said protuberance in said recess, said other arm extending to the side of the rigid member opposite said protuberance.

9. A device for supporting a load from a generally horizontally disposed rigid bar comprising a clamp carrying a protuberance, said clamp being angularly and longitudinally adjustable on the bar and including means for fixedly securing the same to the bar in an adjusted position, said protuberances including a stud extending outwardly from the center thereof, and a C-shaped member having a recess formed in one of its arms at the end thereof and a load engaging surface formed on its other arm in alignment with said recess, said one arm fitting over said protuberance and said stud to position said protuberance in said recess, the body of said C-shaped member and said other arm thereof extending around the bar to the opposite side of the bar whereby said recess and said load supporting surface are aligned to opposite sides of the bar.

References Cited in the file of this patent or the original patent

UNITED STATES PATENTS

| | | |
|---|---|---|
| 981,471 | Proal | Jan. 10, 1911 |
| 2,277,402 | Hoeck | Mar. 24, 1942 |
| 2,555,765 | Shank | June 5, 1951 |
| 2,773,257 | Craggs et al. | Dec. 4, 1956 |

FOREIGN PATENTS

| | | |
|---|---|---|
| 105,141 | Great Britain | Apr. 5, 1917 |
| 329,132 | Great Britain | May 15, 1930 |
| 744,915 | Germany | Jan. 29, 1944 |
| 890,337 | France | Nov. 2, 1943 |